United States Patent [19]

Aihara

[11] Patent Number: 5,642,646

[45] Date of Patent: Jul. 1, 1997

[54] METHOD FOR MANUFACTURING ROTARY CUTTING TOOL AND ROTARY CUTTING TOOL

[75] Inventor: Kintaro Aihara, Chiba, Japan

[73] Assignee: Nippon Petrochemicals Company, Limited, Tokyo, Japan

[21] Appl. No.: 585,746

[22] Filed: Jan. 16, 1996

[51] Int. Cl.$^6$ .................................... B21K 5/00
[52] U.S. Cl. ................................ 76/115; 76/4
[58] Field of Search ............... 83/563, 331; 76/4, 76/115, 101.1; 451/246, 249

[56] References Cited

U.S. PATENT DOCUMENTS

| | | | |
|---|---|---|---|
| 3,162,928 | 12/1964 | Kruse | 76/101.1 |
| 3,374,700 | 3/1968 | Mages | 76/101.1 |
| 4,074,594 | 2/1978 | Dall et al. | 76/115 |
| 4,242,927 | 1/1981 | Oaks | 76/115 |
| 4,860,616 | 8/1989 | Smith | 76/4 |

*Primary Examiner*—Kenneth E. Peterson
*Assistant Examiner*—Sean A. Pryor
*Attorney, Agent, or Firm*—Burns, Doane, Swecker & Mathis, LLP

[57] ABSTRACT

A method for manufacturing a rotary cutting tool for fabricating a sheet having transverse slits. The rotary cutting tool has a cylindrical body having generally longitudinally extending grooves, and cutting blades. The cutting blades are first fitted in the grooves with the cutting edges seated on the bottom surfaces of the grooves, and the base surfaces of the cutting blades projecting from the grooves are machined with a rotary grinding wheel while the cylindrical body is rotated. The cutting blades are then removed from the grooves and are finally fitted in the same grooves. The cutting edges of the cutting blades can be accurately arranged about an axis of the cylindrical body, and the rotary cutting tool can be easily manufactured.

13 Claims, 5 Drawing Sheets

METHOD FOR MANUFACTURING ROTARY CUTTING TOOL AND ROTARY CUTTING TOOL

BACKGROUND OF THE INVENTION

1. Field of the Invention

The present invention relates to a method for manufacturing a rotary cutting tool for forming transverse slits in a sheet such as a paper sheet, a plastic sheet, a metal sheet or the like, and a rotary cutting tool manufactured by the method.

2. Description of the Related Art

Rotary cutting tools are used for forming fully penetrated slits in which cutting edges fully penetrate or pass through a sheet or partially penetrated slits in which cutting edges partially penetrate the sheets, i.e., the depth of the cuts is smaller than the thickness of the sheets to be slitted. The slits formed in the sheet can be used in a variety of ways. For example, the sheet can be easily separated or folded at the position of continuous or discontinuous slits. The slits are formed in a staggered pattern and the sheet is then longitudinally spread to obtain a sheet having a network structure, or the slits are formed in a stretchable plastic sheet and the sheet is then transversely stretched to obtain a sheet having a network structure having high strength in the transverse direction. When the slits are fully penetrated slits and the interval between the longitudinally adjacent rows of slits is relatively large, a shearing cutter can be used. However, when the slits are partially penetrated slits and/or the interval between the longitudinally adjacent rows of slits is relatively small and many slits have to be efficiently formed, an accurately finished rotary cutting tool is used, then the sheet is pinched and conveyed between the rotary cutting tool and a backing roll.

For example, there is a known nonwoven fabric which comprises the lamination of a first sheet having transverse ribbons and a second sheet having longitudinal ribbons arranged so that the transverse ribbons and the longitudinal ribbons intersect with each other as if they are weft and warp of a woven fabric. The first sheet is fabricated from a sheet of plastic film, by forming transverse slits in the sheet with a rotary cutting tool having cutting blades and then laterally stretching the sheet. The second sheet is also fabricated from a sheet of plastic film, by longitudinally streching the sheet, splitting the sheet to form longitudinal splits or slits with another rotary cutting tool and then laterally spreading the sheet. Here, the word "longitudinal" means the longitudinal direction of the continuous sheet or the conveying direction of the continuous sheet. The present invention relates to the rotary cutting tool for forming the first sheet having the transverse slits, although it is not limited to the illustrated example.

The manufacture of the rotary cutting tool for fabricating the sheet having many transverse slits is very difficult because a large number of cutting blades are arranged on the outer circumferential surface of the rotary cutting tool at a small circumferential pitch. For example, the rotary cutting tool includes cutting blades arranged on the outer circumferential surface of the rotary cutting tool at a circumferential pitch of 3.0 millimeter or less.

There are two types of known rotary cutting tools for fabricating the sheet having transverse slits. One type of rotary cutting tool comprises a cylindrical body and cutting blades which are integral with the cylindrical body. That is, the cutting blades are formed one by one by machining or cutting an outer circumferential portion of the cylindrical body. After the rotary cutting tool is roughly machined, a hardening treatment, for example, cementation, is applied to the rotary cutting tool, and it is manually finished while observing the cutting blades through a microscope. To manufacture this rotary cutting tool, an artisan must have enough experience and high skill, and yet a considerable time is necessary to complete one rotary cutting tool. In addition, the material of the rotary cutting tool should not be so hard because it must be machined, and such a material does not ensure a long operation life of the cutting blades of the rotary cutting tool.

Another type of rotary cutting tool comprises a cylindrical body having grooves arranged in the outer circumferential surface generally parallel to the axis of the cylindrical body, and cutting blades fitted in the grooves. In this case, it is desirable that the cutting edges of the cutting blades are accurately arranged on a circle about the axis of the cylindrical body, but in practice, the cutting edges of the cutting blades are not accurately arranged on a circle about the axis of the cylindrical body. There is a deviation in the heights of the cutting edges from the axis of the cylindrical body, and such a deviation is larger than an allowable level. That is, the grooves of the cylindrical body are machined and there is a deviation in the bottom surfaces of the grooves from the axis of the cylindrical body, but such a deviation is inevitably large because accurate machining cannot be ensured for narrow and dense grooves. The cutting blades themselves contain a certain deviation and a deviation of the cutting edges of the cutting blades is added to a deviation of the grooves when the cutting blades are fitted in the grooves of the cylindrical body. To solve this problem, the depths of the grooves and the heights of the cutting blades are measured, respectively, and appropriate cutting blades are selected for particular grooves so that a deviation in the heights of the cutting blades when they are fitted in the grooves becomes smaller, but a deviation in the heights of the cutting blades is still larger than an allowable level. To mitigate the deviation in the heights of the cutting blades, it is conceived that the cutting blades are adjustably fixed in the grooves, using adjusting device, shim screws and so on. However, in the case of the rotary cutting tool having a large number of cutting blades arranged at a small circumferential pitch, it is not possible to arrange and use adjusting screws because the area or space per groove is very small.

It is needless to say that the cutting edges of the cutting blades must be accurately arranged relative to the axis of the rotary cutting tool when the slits are partially penetrated slits and the sheet is thin. It is necessary too that the cutting edges of the cutting blades must be accurately arranged when the slits are fully penetrated slits or when the slits are arranged at a relatively large pitch. If the cutting edges of the cutting blades are not accurately arranged, the slits are not exactly formed and it is necessary to increase a pressure applied between the rotary cutting tool and the backing roll. However, if an excessive load is applied, operating life of the cutting blades and the backing roll is reduced. Therefore, the cutting edges of the cutting blades must be accurately arranged when the slits are fully penetrated slits.

When the rotary cutting tool is of the integral type in which the cutting blades are integral with the cylindrical body and formed by machining the outer circumferential portion of the cylindrical body, high skill and a great deal of labor are necessary, as described above. In addition, if only a part of the cutting blades is damaged during the manufacture of the rotary cutting tool or in use, it is sometimes difficult to re-arrange or re-machine the cutting blades depending on an extent of damage, and accordingly a new rotary cutting tool must be manufactured. In particular, when the sheet is a thermoplastic plastic sheet which is stretched in a heated condition after slits are formed in the sheet, a material of the sheet having the slits may be broken during stretching if there are defective slits formed in the slit forming process, and in this case, the cutting blades are sometimes heated above a melting point of the plastic sheet in the slit forming process to avoid this problem. However, the cutting blades are subjected to a thermal deformation, so it is difficult to maintain a desired accuracy of the cutting blades in the heated condition. It is also difficult to finish the cutting tool, expecting that the cutting edges can maintain high accuracy in the heated condition.

SUMMARY OF THE INVENTION

The object of the present invention is to provide a method for manufacturing a rotary cutting tool and a rotary cutting tool manufactured by such a method, by which the rotary cutting tool can be manufactured in a short time and without special experience and skill.

Another object of the present invention is to provide a method for manufacturing a rotary cutting tool and a rotary cutting tool manufactured by such a method, in which the rotary cutting tool has cutting blades having accurately arranged cutting edges.

According to the present invention, there is provided a method for manufacturing a rotary cutting tool for forming transverse slits in a sheet, the method comprising the steps of: preparing a cylindrical body having an axis, an outer circumferential surface and grooves arranged on the outer circumferential surface generally parallel to the axis, the grooves having bottom surfaces, preparing cutting blades each having a cutting edge and a base surface opposite the cutting edge; fitting the cutting blades in the grooves with the cutting edges seated on the bottom surfaces of the grooves; machining the base surfaces of the cutting blades with a tool; removing the cutting blades from the grooves; and again fitting the cutting blades in the initially fitted grooves with the base surfaces seated on the bottom surfaces of the grooves.

In this method, the cutting blades are provisionally fitted in the grooves with the cutting edges seated on the bottom surfaces of the grooves and the base surfaces projecting from the grooves, and the base surfaces of the cutting blades are machined with a tool while the cylindrical body is rotated about the axis thereof. Therefore, the base surfaces of the cutting blades are machined so that the base surfaces are accurately on a circle about the axis of the cylindrical body. The cutting blades are then removed from the grooves, and are finally fitted in the initially fitted grooves with the base surfaces seated on the bottom surfaces of the grooves and the cutting edges projecting from the grooves. Therefore, the cutting edges of the cutting blades are accurately on a circle corresponding to the circle on which the base surfaces are located when the base surfaces are machined. Accordingly, the rotary cutting tool has cutting blades having accurately arranged cutting edges, and it is possible to easily manufacture a rotary cutting tool for a shorter time, and without special experience and skill.

Preferably, the step of fixing the cutting blades in the grooves is further provided after the cutting blades are finally fitted in the grooves. In this case, the step of fixing the cutting blades in the grooves preferably comprises causing a material of the cylindrical body to be deformed so that a wall of the grooves is forced against the cutting blades, preferably at longitudinally spaced positions. Alternatively, the step of fixing the cutting blades in the grooves preferably comprises adhering the cutting blades in the grooves.

Preferably, the step of provisionally fixing the cutting blades in the grooves is further provided after the cutting blades are firstly fitted in the grooves and before the cutting blades are machined. In this case too, the step of provisionally fixing the cutting blades in the grooves preferably comprises causing a material of the cylindrical body to be deformed so that a wall of the grooves is forced against the cutting blades, preferably at longitudinally spaced positions. Alternatively, the step of provisionally fixing the cutting blades in the grooves preferably comprises adhering the cutting blades in the grooves.

Preferably, the tool comprises a rotatable grinder wheel having an axis parallel to the axis of the cylindrical body.

The present invention also provides a rotary cutting tool for forming transverse slits in a sheet, the rotary cutting tool comprising: a cylindrical body having an axis, an outer circumferential surface and grooves arranged on the outer circumferential surface generally parallel to the axis, the grooves having bottom surfaces; cutting blades each having a cutting edge and a base surface opposite the cutting edge; the cutting blades being fitted in the grooves with the base surfaces seated on the bottom surfaces of the grooves and the cutting edges projecting from the grooves; and the grooves having traces indicating that the cutting blades are provisionally fitted in the grooves with the cutting edges seated on the bottom surfaces of the grooves.

This rotary cutting tool can be manufactured according to the above described method, and thus includes traces on the grooves indicating that the cutting blades are provisionally fitted in the grooves with the cutting edges seated on the bottom surfaces of the grooves.

The traces may be located on bottom surfaces of the grooves and formed by the cutting edges which are driven in the grooves. Alternatively, the cutting blades are fixed in the grooves by a material of the cylindrical body, deformed so that a wall of the grooves is forced against the cutting blades at at least one first position, and the traces may comprise deformation of a wall of the grooves which were forced against the cutting blades to provisionally fix the cutting blades at at least one second position other than said at least one first position.

Preferably, the bottom surfaces of the grooves are arranged at distances from the axis of the cylindrical body with a first deviation, and the cutting edges of the cutting blades are arranged at distances from the axis of the cylindrical body with a second deviation the second deviation being smaller than the first deviation.

Preferably, the grooves are arranged at a circumferential pitch smaller than 5 millimeters, more preferably smaller than 3.0 millimeters.

Preferably, the grooves extend at a small angle relative to the axis of the cylindrical body.

Preferably, the cylindrical body includes heating means.

Preferably, the cylindrical body comprises copper alloy, and the cutting blades comprise high-speed steel.

Preferably, a stopper means is provided to restrict the penetration of the cutting blades into the sheet.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
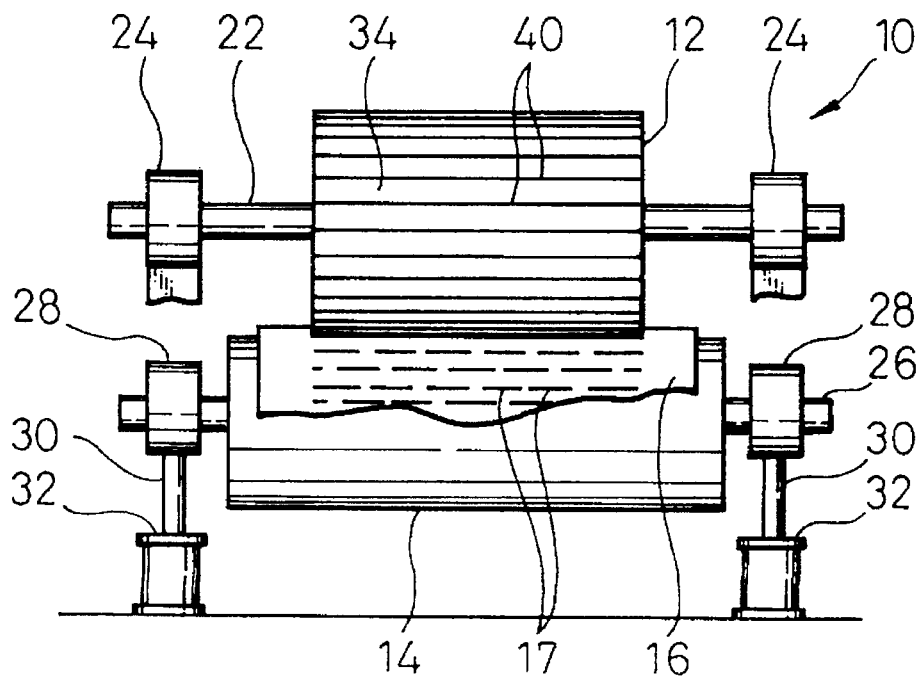
FIG. 1 is a front view of a transverse slit forming machine according to the first embodiment of the present invention.
Figure 2:
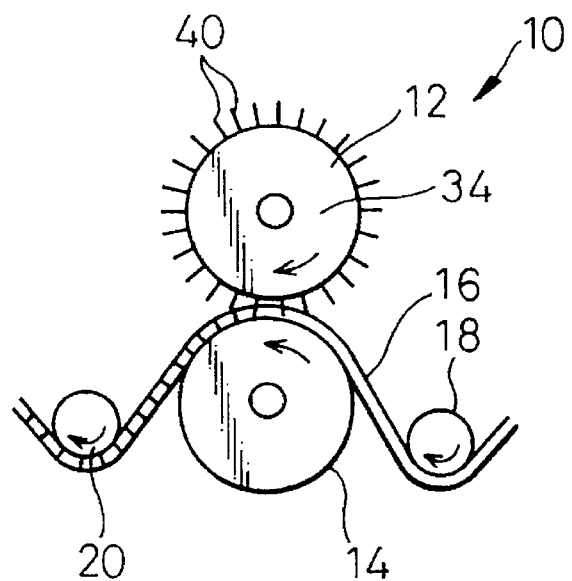
FIG. 2 is a diagrammatic side view of the transverse slit forming machine of FIG. 1.

FIGS. 1 and 2 show a transverse slit forming machine 10 for forming transverse slits in a sheet. The machine 10 includes a rotary cutting tool 12 and a backing roller 14. A sheet 16 is conveyed or guided to and from the rotary cutting tool 12 by conveying rollers 18 and 20. The rotary cutting tool 12 has a shaft 22 which is rotatably supported by bearings 24 which are fixedly supported by a machine frame portion. The backing roller 14 has a shaft 26 which is rotatably supported by bearings 28 which are attached to piston rods 30 of fluid cylinders 32. Therefore, the backing roller 14 is resiliently urged against the rotary cutting tool 12. The rotary cutting tool 12 is driven in rotation by a not shown drive source.

As shown in FIGS. 1 to 4, the rotary cutting tool 12 comprises a cylindrical body 34 having an axis 36, an outer circumferential surface and grooves 38 arranged in the outer circumferential surface generally parallel to the axis 36. The grooves 38 can extend at a small angle relative to the axis 36 of the cylindrical body 34. Cutting blades 40 are fitted in the grooves 38. Each of the cutting blades 40 has a cutting edge 40a and a base surface 40b opposite the cutting edge 40a. The base surfaces 40b are seated on the bottom surfaces of the grooves 38 and the cutting edges 40a project from the grooves 38. Therefore, the sheet 16 is pinched between the rotary cutting tool 12 and the backing roller 14, so that transverse slits 17 are formed in the sheet 16 by the cutting edges 40a. Each of the cutting blades 40 also has notches 40c in the cutting edge 40a. The rotary cutting tool 12 also has electric heaters 42.

In the embodiment, the cylindrical body 34 has a diameter of 120 mm and a length of 400 mm, and the number of the grooves 38 (and of the cutting blades 40) is 240. Therefore, the grooves 38 (and the cutting blades 40) are arranged on the outer circumferential surface of the cylindrical body 34 at a circumferential pitch of approximately 1.6 mm. Each of the cutting blades 40 has a width in the range from 0.4 to 0.6 mm and a height of approximately 7 mm. Each of the grooves 38 has a depth of approximately 5 mm and a width generally equal to or slightly larger than the width of the cutting blade 40 so that a clearance arises between the cutting blade 40 and the side wall of the groove 38 in the range from 0.01 to 0.02 mm. The cylindrical body 34 is made from copper alloy, and the cutting blades 40 are made from high-speed steel.

FIGS. 5A to 5E are views illustrating a method for manufacturing the rotary cutting tool 12 of FIGS. 1 to 4.

Figure 3:
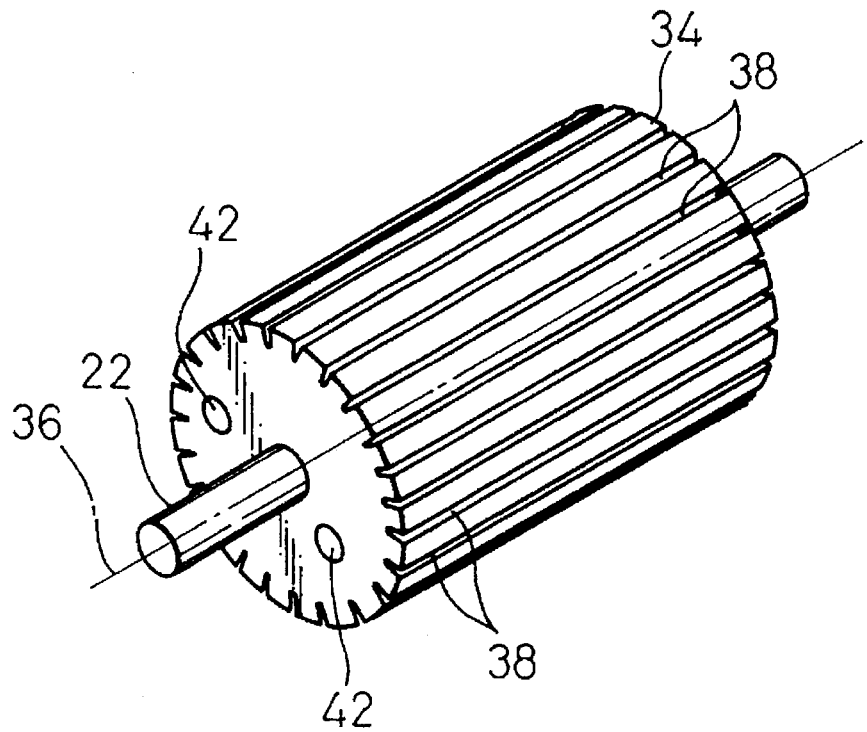
FIG. 3 is a perspective view of the rotary body of the rotary cutting tool of FIGS. 1 and 2.
Figure 4:
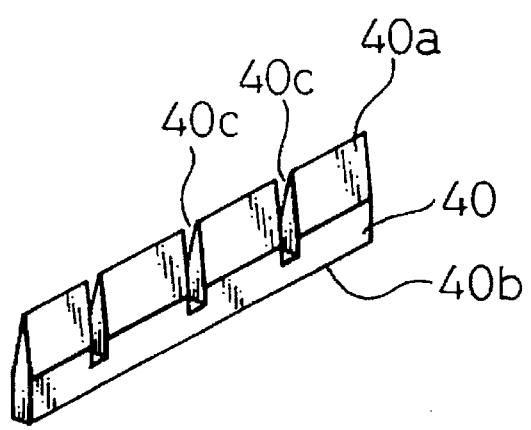
FIG. 4 is a perspective view of the cutting tool of the rotary cutting tool of FIGS. 1 and 2.
Figure 5A:
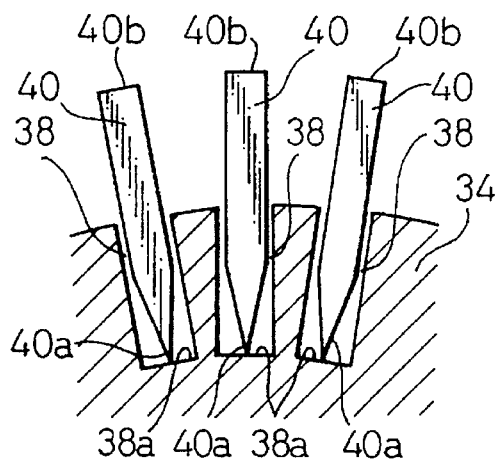
FIG. 5A to 5E are views illustrating a method for manufacturing the rotary cutting tool of FIGS. 1 to 4.

The cylindrical body 34 and the cutting blades 40 are prepared, as shown in FIGS. 3 and 4. The cutting blades 40 are fitted in the grooves 38 so that the cutting edges 40a are seated on the bottom surfaces 38a of the grooves 38 and the base surfaces 40b project from the grooves 38, as shown in FIG. 5A. The cutting blades 40 may be driven into the grooves 38 by a hammer, and the cutting edges 40a slightly impinge against the bottom surfaces 38a of the grooves 38. As a result, traces indicating that the cutting blades 40 are provisionally fitted in the grooves 38 may remain on the bottom surfaces 38a of the grooves 38.

Figure 5B:
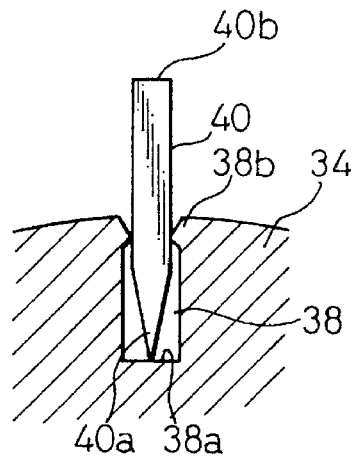

Each of the cutting blades 40 is preferably straight along its length, but the cutting blade 40 may be slightly warped along its length. Therefore, the cutting blades 40 may be frictionally held in the grooves 38 when the cutting blades 40 are fitted in the grooves 38. In addition, it is preferable to provisionally fix the cutting blades 40 in the grooves 38. To this end, a material of the cylindrical body 34 adjacent the grooves 38 is deformed so that a wall 38b of the grooves 38 is forced against the cutting blades 38 at longitudinally spaced points, as shown in FIG. 5B. The deformation can be caused by a weak force, for example, by a knock of a driver. Alternatively, the provisional fixing of the cutting blades 40 in the grooves 38 can be carried out by filling an adhesive in a gap between the cutting blades 40 and the grooves 38. When the cutting blades 40 are to be removed from the grooves 38, the adhesive is dissolved by a solvent.

Figure 5C:
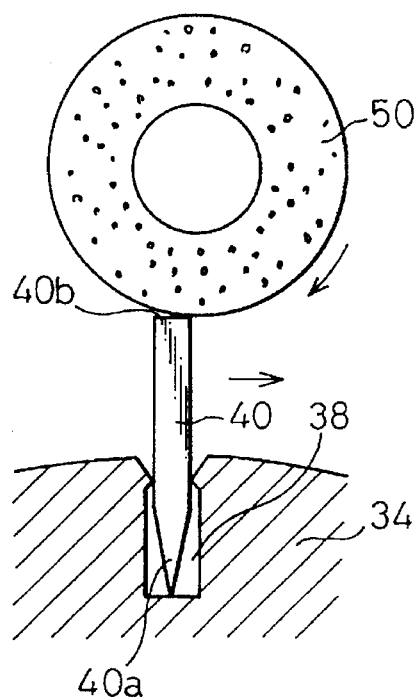

The base surfaces 40b of the cutting blades 40 are then machined with a tool 50, preferably a grinding wheel having an axis parallel to the axis 36 of the cylindrical body 34, while the cylindrical body 34 is rotated about the axis 36 thereof, as shown in FIG. 5C. The grinding wheel is also rotated about its axis and moved along its axis. Therefore, the base surfaces 40b of the cutting blades 40 are machined so that the base surfaces 40b are accurately on a circle about the axis 36 of the cylindrical body 34, even if there is a considerable deviation in the depths of the grooves 38 about the axis 36 of the cylindrical body 34.

Figure 5D:
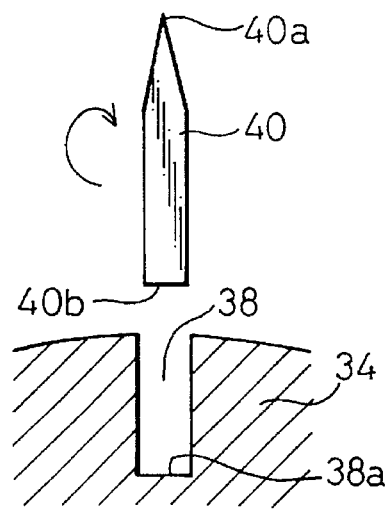
Figure 5E:
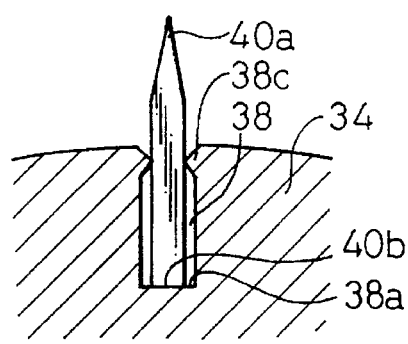

The cutting blades 40 are then removed from the grooves 38, and are again fitted in the initially fitted grooves 38 so that the base surfaces 40b are seated on the bottom surfaces 38a of the grooves 38 and the cutting edges 40a project from the grooves 38, as shown in FIGS. 5D and 5E. Therefore, the cutting edges 40a of the cutting blades 40 are accurately on a circle corresponding to the circle on which the base surfaces 40b are located when the base surfaces 40b are machined. In this case, the cutting edges 40a and the base surfaces 40b are reversed, maintaining the left-left and right-right relationship. Accordingly, the rotary cutting tool 12 has cutting blades 40 having accurately arranged cutting edges 40a, and it is possible to easily manufacture the rotary cutting tool 12 with high accuracy for a shorter time, and without special experience and skill.

The bottom surfaces 38a of the grooves 38 are arranged at distances from the axis 36 of the cylindrical body 34 with a first deviation, and the cutting edges 40a of the cutting blades 40 are arranged at distances from the axis 36 of the cylindrical body 34 with a second deviation. It will be clear that the second deviation is considerably smaller than the first deviation. For example, the cutting edges 40a of the cutting blades 40 are arranged at distances from the axis 36 of the cylindrical body 34 with a deviation of ±2.5/1000 mm, while the bottom surfaces 38a of the grooves 38 are arranged at distances from the axis 36 of the cylindrical body 34 with a deviation of ±1.0/10 mm. That is, it is possible to fully decrease the second deviation, without the influence of the first deviation and the accuracy of the height of cutting edges 40 before fitting.

It is also necessary to fix the cutting blades 40 in the grooves 38. To this end, a material of the cylindrical body 34 adjacent the grooves 38 is deformed so that a wall 38c of the grooves 38 is forced against the cutting blades 38 at longitudinally spaced points, as shown in FIG. 5E. The deformation 38c is caused at positions other than those in the provisional fixing, so that the traces of the initial deformation 38b during the provisional fixing remain. Alternatively, the final fixing of the cutting blades 40 in the grooves 38 can be carried out by filling an adhesive in a gap between the cutting blades 40 and the grooves 38.

The rotary cutting tool 12 comprising the cylindrical body 34 made from copper alloy and the cutting blades 40 made from high-speed steel can be manufactured in one week, using conventional machine tools and a grinder, and can normally be operated for 5,000 hours to form transverse slits 17 in a sheet 16 of polyethylene film having a thickness of 200 μm. As a comparative test, a conventional rotary cutting tool comprising a cylindrical body and cutting blades integral with the cylindrical body is made from nickel chrome steel which is subjected to a cementation hardening treatment. Approximately 6 months is needed, to manufacture one conventional integral rotary cutting tool, by an artisan having a special experience and skill, and its operating time is about ⅕ to ⅒ of the operating time of the rotary cutting tool 12 of the present invention. Another conventional rotary cutting tool comprising a cylindrical body with grooves and cutting blades fitted in the grooves without using the present method was manufactured, and approximately one month was needed to manufacture one conventional integral rotary cutting tool. For the manufacture of this conventional rotary cutting tool, many expensive cutting blades, more than, for example, three times as many as needed, are prepared and good cutting blades must be selected within the prepared group and selected cutting blades are fitted in the grooves. The deviation in the heights of the cutting edges was ±1.0/1.00 mm, and this is an unsatisfactory level.

Figure 6:
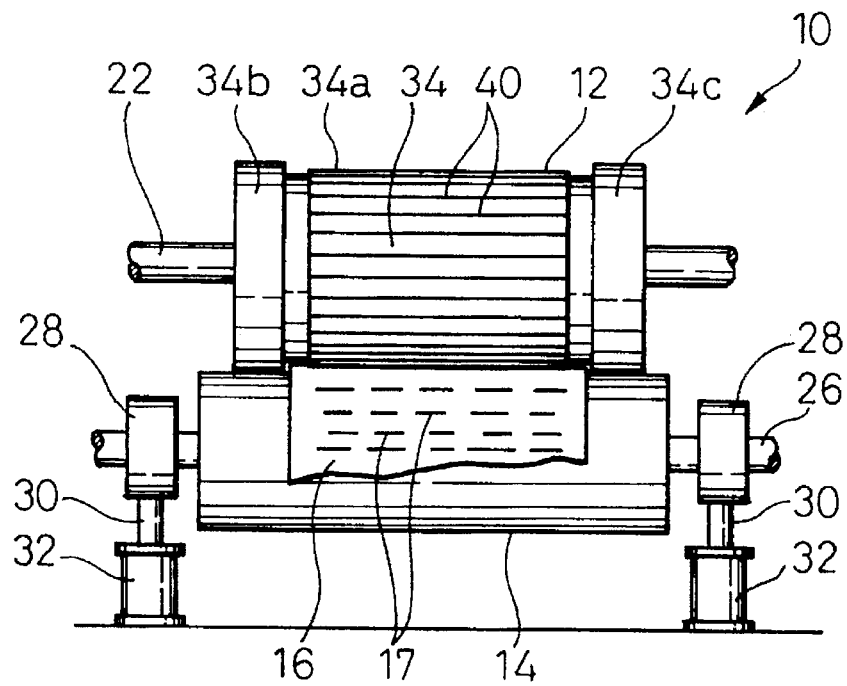
FIG. 6 is a front view of a transverse slit forming machine according to the second embodiment of the present invention.

FIG. 6 shows a a transverse slit forming machine 10 according to the second embodiment of the present invention. This embodiment includes elements similar to those of the embodiment of FIG. 1. Namely, a sheet 16 is passed between a rotary cutting tool 12 and a backing roller 14, so that transverse slits 17 are formed in the sheet 16 by the rotary cutting tool 12. The rotary cutting tool 12 comprises a cylindrical body 34 having grooves in which cutting blades 40 are fitted. The rotary cutting tool 12 is manufactured according to the method described above. The rotary cutting tool 12 has a shaft 22 which is rotatably supported by bearings 24, and the backing roller 14 has a shaft 26 which is rotatably supported by bearings 28 attached to piston rods 30 of fluid cylinders 32. Therefore, the backing roller 14 is resiliently urged against the rotary cutting tool 12.

The cylindrical body 34 has a central portion 34a where grooves are formed, and end portions 34b and 34c grooves are not formed. The diameter of the end portions 34b and 34c is slightly greater than that of the central portion 34a, so that the penetration of the cutting blades 40 into the sheet 16 passing between the rotary cutting tool 12 and the backing roller 14 is restricted. Therefore, the cutting blades 40 do not fully penetrate the sheet 16, and the cutting edges of the cutting blades 40 partially pierce the sheet 16 to form transverse slits 17 in the sheet 16.

Figure 7:
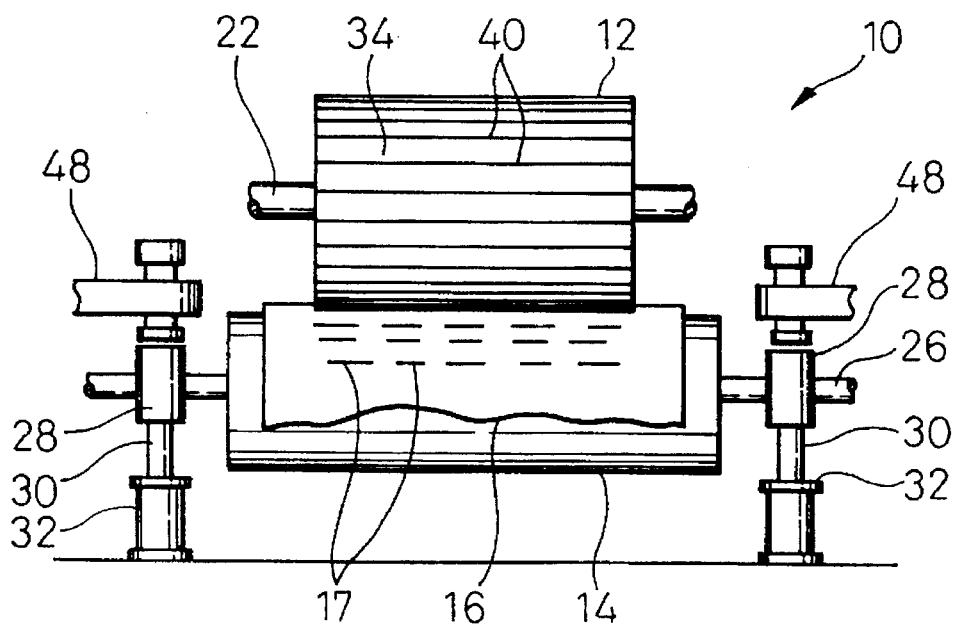
FIG. 7 is a front view of a transverse slit forming machine according to the third embodiment of the present invention.

FIG. 7 shows a transverse slit forming machine 10 according to the third embodiment of the present invention. This embodiment includes elements similar to those of the embodiment of FIG. 1. Namely, a sheet 16 is passed between a rotary cutting tool 12 and a backing roller 14, so that transverse slits 17 are formed in the sheet 16 by the rotary cutting tool 12. The rotary cutting tool 12 comprises a cylindrical body 34 having grooves in which cutting blades 40 are fitted. The rotary cutting tool 12 is manufactured according to the method described above. The rotary cutting tool 12 has a shaft 22 which is rotatably supported by bearings 24, and the backing roller 14 has a shaft 26 which is rotatably supported by bearings 28 attached to piston rods 30 of fluid cylinders 32. Therefore, the backing roller 14 is resiliently urged against the rotary cutting tool 12.

Stoppers 48 are arranged above the bearings 28 to restrict the upward movement of the bearings 28, so that the penetration of the cutting blades 40 into the sheet 16 passing between the rotary cutting tool 12 and the backing roller 14 is restricted. Therefore, the cutting blades 40 do not fully penetrate the sheet 16, but the cutting edges of the cutting blades 40 partially 10 pierce the sheet 16 to form transverse slits 17 in the sheet 16, without damaging the sheet 16.

Figure 8:
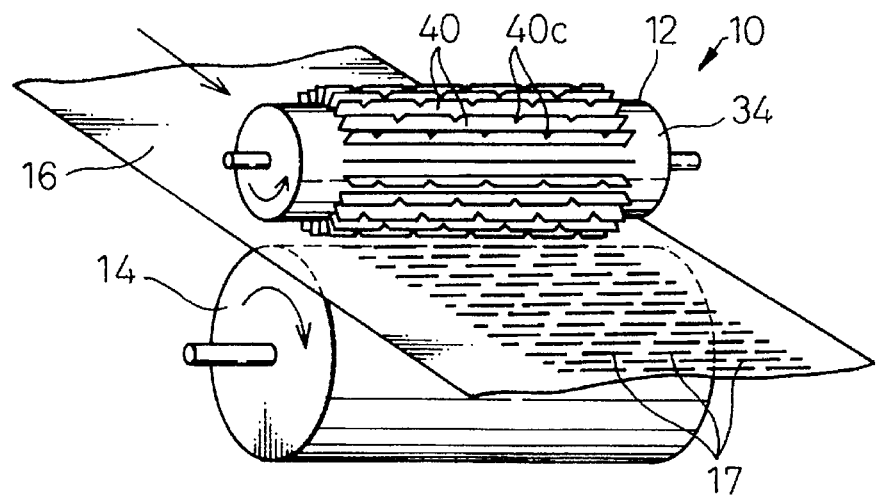
FIG. 8 is a perspective view of the transverse slit forming machine, illustrating the operation thereof.

FIG. 8 illustrates the operation of the transverses slit forming 10. Rows of transverse slits 17 are formed in the sheet 16, and the transverse slits 17 are arranged in a staggered arrangement owing to the provision of the notches 40c in the cutting blades 40.

Figure 9:
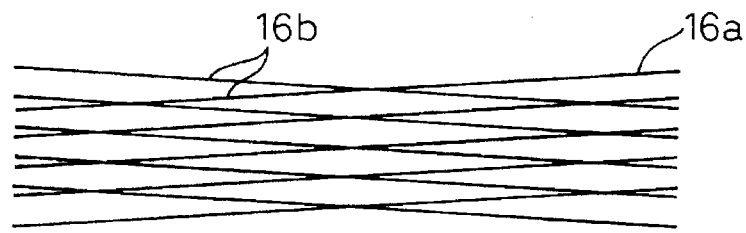
FIG. 9 is a plan view of a transverse sheet having transverse ribbons after the sheet is laterally stretched.

FIG. 9 shows a transverse sheet 16a having transverse ribbons 16b. The sheet 16 having the transverse slits 17 of FIG. 8 is then laterally stretched, and a material of the sheet 16 between the transverse slits 17 is narrowed to become transverse ribbons 16b.

Figure 10:
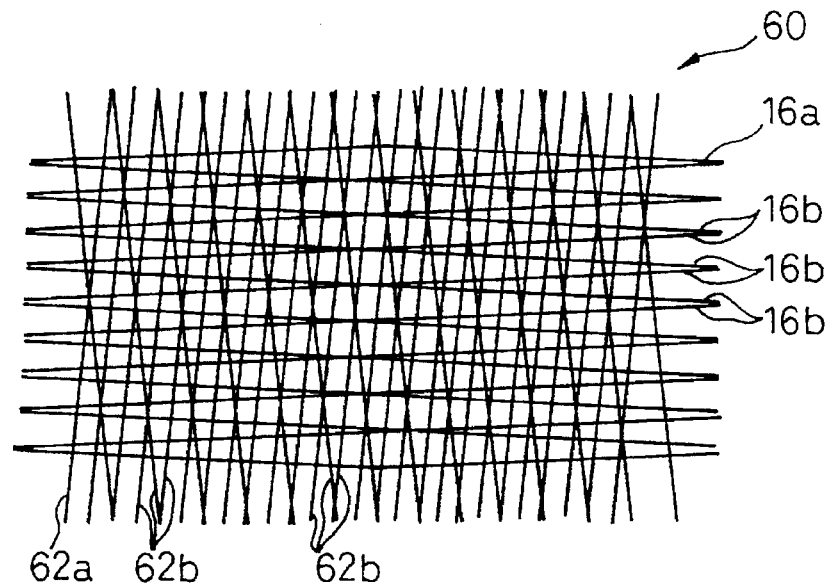
FIG. 10 is a plan view of a nonwoven fabric including the transverse sheet of FIG. 9.

FIG. 10 shows a nonwoven fabric 60 including the transverse sheet 16a of FIG. 9. The nonwoven fabric 60 comprises the lamination of the transverse sheet 16a having transverse ribbons 16b and a longitudinal sheet 62a having longitudinal ribbons 62b arranged so that the transverse ribbons 16b and the longitudinal ribbons 62b intersect with each other as if they are weft and warp of a woven fabric. The longitudinal sheet 62a can be fabricated from a sheet of plastic film, by longitudinally stretching the sheet, splitting the sheet to form longitudinal splits or slits with another rotary cutting tool and then laterally spreading the sheet. It will be appreciated that the transverse ribbons 16b are arranged close to each other and that the grooves 38 and the cutting blades 40 should be correspondingly arranged at a small circumferential pitch. The grooves 38 are preferably arranged at a circumferential pitch smaller than 5 millimeters, and in more preferably, at a circumferential pitch smaller than 3.0 millimeters. Therefore, the manufacture of the conventional rotary cutting tool was difficult, but the rotary cutting tool 12 of the present invention can be easily manufactured.

I claim:

1. A method for manufacturing a rotary cutting tool for forming transverse slits in a sheet, said method comprising the steps of:

preparing a cylindrical body having an axis, an outer circumferential surface and grooves arranged on the outer circumferential surface generally parallel to the axis, the grooves having bottom surfaces, preparing cutting blades each having a cutting edge and a base surface opposite the cutting edge;

fitting the cutting blades in the grooves with the cutting edges seated on the bottom surfaces of the grooves;

machining the base surfaces of the cutting blades with a tool;

removing the cutting blades from the grooves; and fitting again the cutting blades in the initially fitted grooves with the base surfaces seated on the bottom surfaces of the grooves.

2. A method according to claim 1, further comprising the step of fixing the cutting blades in the grooves after the cutting blades are finally fitted in the grooves.

3. A method according to claim 2, wherein the step of fixing the cutting blades in the grooves comprises causing a material of the cylindrical body to be deformed so that a wall of the grooves is forced against the cutting blades.

4. A method according to claim 3, wherein a material of the cylindrical body is deformed at longitudinally spaced positions.

5. A method according to claim 2, wherein the step of fixing the cutting blades in the grooves comprises adhering the cutting blades in the grooves.

6. A method according to claim 1, further comprising the step of provisionally fixing the cutting blades in the grooves after the cutting blades are firstly fitted in the grooves and before the cutting blades are machined.

7. A method according to claim 6, wherein the step of provisionally fixing the cutting blades in the grooves comprises causing a material of the cylindrical body to be deformed so that a wall of the grooves is forced against the cutting blades.

8. A method according to claim 7, wherein a material of the cylindrical body is deformed at longitudinally spaced positions.

9. A method according to claim 6, wherein the step of provisionally fixing the cutting blades in the grooves comprises adhering the cutting blades in the grooves.

10. A method according to claim 1, wherein said tool comprises a rotatable grinder wheel having an axis parallel to the axis of the cylindrical body.

11. A method according to claim 1, wherein the grooves extend at a small angle relative to the axis of the cylindrical body.

12. A method according to claim 1, wherein the cutting blades are heated.

13. A method according to claim 1, wherein the cylindrical body comprises copper alloy, and the cutting blades comprise high-speed steel.

* * * * *